United States Patent [19]
Chudacek et al.

[11] Patent Number: 5,660,718
[45] Date of Patent: Aug. 26, 1997

[54] METHOD AND APPARATUS FOR SEPARATION BY FLOTATION

[75] Inventors: Michael Wenzel Chudacek, Woy Woy; Stephen Henry Marshall, North Ryde; Charles Harold Warman, Castecrag, all of Australia

[73] Assignee: M.D. Research Company Pty, Ltd., New South Wales, Australia

[21] Appl. No.: 495,649

[22] PCT Filed: Jan. 20, 1994

[86] PCT No.: PCT/AU94/00026

§ 371 Date: Sep. 13, 1995

§ 102(e) Date: Sep. 13, 1995

[87] PCT Pub. No.: WO94/17920

PCT Pub. Date: Aug. 18, 1994

[30] Foreign Application Priority Data

Feb. 10, 1993 [AU] Australia ................... PL7201

[51] Int. Cl.$^6$ ............... B03D 1/02; B03D 1/24
[52] U.S. Cl. ............. 209/164; 209/168; 209/170; 210/221.2; 162/4
[58] Field of Search ................ 209/164, 168, 209/170; 210/703, 221.1, 221.2, 209; 162/4

[56] References Cited

U.S. PATENT DOCUMENTS

| | | |
|---|---|---|
| 1,187,772 | 6/1916 | Ohrn . |
| 1,282,730 | 10/1918 | Arzinger . |
| 1,297,372 | 3/1919 | Loventhal et al. . |
| 1,328,456 | 1/1920 | Ross . |
| 1,367,223 | 2/1921 | Appelqvist . |
| 1,840,267 | 1/1932 | Tschudy . |
| 2,416,066 | 2/1947 | Phelps . |
| 2,850,164 | 9/1958 | McCue . |
| 3,326,373 | 6/1967 | Lang . |

FOREIGN PATENT DOCUMENTS 1284600  1/1987  U.S.S.R. .

*Primary Examiner*—Thomas M. Lithgow
*Attorney, Agent, or Firm*—Jacobson, Price, Holman & Stern, PLLC

[57] ABSTRACT

A suitably conditioned slurry feed is introduced to a trough from which it is distributed into a slurry layer-flow forming chamber provided with a discharge weir which discharges an evenly spread layer of slurry onto an inclined plate feeding into a mixing passage and then into a vessel. Recirculated slurry from the vessel is also fed into the mixing passage via a recycle gate which forms it into a layer of slurry. An array of clean liquid jets accelerates thin gas envelopes and impinges between layers of slurry and causes intensive mixing of all streams in the mixing passage. A high shear rate produces high intensity turbulence and shears gas into very small bubbles. A multiphase mixture flow is discharged from the mixing passage into the vessel, where it flows past one or more longitudinal stabilizing baffles. Gas bubbles loaded with hydrophobic particles disengage from the stream, rise toward the liquid surface and are diverted by bubble-diverting guides toward a froth discharge end of the vessel. A layer of froth travels toward a froth weir where it is discharged. Residual slurry leaves a discharge launder via a weir to a following flotation cell or process stage.

23 Claims, 3 Drawing Sheets

METHOD AND APPARATUS FOR SEPARATION BY FLOTATION

The invention relates to an improved method and apparatus for separation by flotation as applied in mineral ore beneficiation, waste water treatment, paper pulp deinking and the like.

BACKGROUND OF THE INVENTION

Flotation is a process commonly used for the separation of dispersed particulate matter from slurries or suspensions and also for the separation of oily substances from emulsions, typically water based. The flotation process relies on particle collection by attachment to air bubbles deliberately dispersed in the suspension. Collection results from particle surfaces being either naturally hydrophobic or rendered selectively hydrophobic by conditioning with appropriate reagents. Bubbles with attached hydrophobic particles subsequently rise under their natural buoyancy to form a surface froth layer which is removed from the residual suspension. Typically, after a certain residence time, almost all hydrophobic particles are removed. Surfactants are usually added in the case of mineral slurries to facilitate formation of a stable froth on the slurry surface.

An important objective of any flotation apparatus is to disperse the introduced gas as finely as possible to maximise the bubble population and to create an environment in which there is a high probability of successful particle/bubble collision. The apparatus must also have a quiescent zone which allows bubbles to separate from the gasified pulp and coalesce to form a froth on the pulp surface, for subsequent removal. The various forms of known apparatus can be divided into three categories with respect to the mechanism of particle/bubble collision. In the first category, particle/bubble contacting is conducted at gravitational acceleration by cruising bubble collision. This type of contacting is known to lose its efficiency as particles get smaller. The rate of particle/bubble collision in these processes is relatively low so a long residence time is required to yield satisfactory recovery. Typical apparatus in this category includes all purely pneumatic cells and conventional flotation columns.

In the second category, particle/bubble contacting is conducted by precipitation of gas on the hydrophobic surface. Typical apparatus in this group includes dissolved air flotation systems.

In the third group of apparatus, particle/bubble collision occurs mostly at accelerations much higher than gravitational, leading to better collision efficiency due to the effect of inertial impaction. Inertial impaction at high acceleration levels is an important mechanism for enhancing particle/bubble collision, particularly for very fine particles which are known to have very low collision rates at gravitational acceleration levels due to their tendency to follow flowlines around the bubble. Higher acceleration levels increase the inertia of the fine particles so they depart, from the liquid flowline and the probability of their collision with bubbles substantially increases. The generation of shear rates required for effective gas dispersion in flotation devices usually results in high accelerative fields, but such fields are seldom created by deliberate design, as they are usually a by-product of a gas dispersing or solids suspension technique. This applies in the case of gas dispersion by intensive impeller agitation, widely used in commercial types of mechanical flotation cells, dispersion by crossflow gas injection as in the Bahr cell [1], dispersion in swirling nozzles as in the Davcra cell [2], and dispersion by a plunging jet into a column of slurry as in the Jameson cell [3]. Only the gas sparged hydrocyclone [4] conducts flotation in a deliberately high centrifugal accelerative field with gas crossflow. In this device gas is injected through a porous cylindrical wall of the hydrocyclone into rapidly moving slurry having a spiral motion. The resulting high liquid shear rate generates small bubbles which move quickly through the slurry due to high accelerative forces and collide with hydrophobic particles in the process. Unfortunately this device is rather energy demanding and its performance is hindered by blockages of the porous septum. The gas sparged hydrocyclone is further disadvantaged in the case of minerals beneficiation by its limited ability to produce high grade concentrates. It produces finely structured froth which is rapidly removed from the device, offering little opportunity for froth drainage normally required for grade improvement, nor is froth washing physically possible in the device to improve concentrate grade.

All of the above known devices have a disadvantage in that the acceleration intensities that can be achieved are limited, either because the device was not designed with this parameter in mind, or because maintaining high acceleration intensities would lead to excessive energy consumption or wear problems of moving or stationary parts exposed to high velocity-abrasive slurry flows. For example, in impeller flotation machines the gas cannot be dispersed effectively unless the impeller speed is high, and this leads to high power input and substantial wear problems. Therefore, to enhance the separation of fine particles in particular, flotation technology would clearly benefit from an apparatus which is designed to generate very high shear rates and accelerative fields without the associated wear problems and excessive energy consumption as encountered in current known technology.

It is the purpose of the present invention to provide a simple, efficient and economic means to improve the flotation process by creating in a flotation apparatus, a mixing zone with both the very high shear rate necessary for fine gas dispersion and accelerative and decelerative fields which improve the probability of particle bubble contacting, but without any moving or complex stationary parts being exposed-to high velocity flows of abrasive slurry. It is a further purpose of the invention to be able to introduce conditioning chemicals if required, via a liquid jet, as well as to utilize a novel froth crowding technique to obtain higher concentrate grades without the necessity of froth washing.

SUMMARY OF THE INVENTION

In one aspect the invention provides a method for separating dispersed particulate materials suspended in liquids, and/or for separating dispersed liquid phases from emulsions, said method comprising the steps of introducing into a mixing passage a first layer of fresh liquid mixture and a second, separate layer of liquid mixture, entraining and dispersing gas to said two-layers of liquid mixture by means of high velocity clean liquid jets impinging essentially between and shearing said two layers of liquid mixture in said mixing passage, and separating the resultant multiphase mixture downstream of said mixing passage into a froth phase and residual liquid mixture phases. In the context of the invention, clean liquid refers to a liquid which may contain soluble solids but which has been filtered to remove all but traces, typically less than 1 part per million, of particles above a certain size, typically less than 5 micrometres.

A further aspect of the invention provides apparatus for separating dispersed particulate materials suspended in liquids, and/or for separating dispersed liquid phases from emulsions, said apparatus comprising a primary feeding device forming a first layer of fresh liquid mixture, a second feeding device forming a second, separate, layer of liquid mixture, a mixing passage receiving said layers of liquid mixture, an array of nozzles for providing high velocity clean liquid jets impinging essentially between said two layers of liquid mixture to form a multiphase mixture in said mixing passage, and means for separating said multiphase mixture downstream of said mixing passage into a froth phase and residual liquid mixture phases and means for separate discharge of froth phase and residual liquid mixture phase.

The flotation process may be carried out in multiple steps described as follows. A fresh suspension of finely ground or otherwise dispersed material constituting a liquid mixture, which has been appropriately conditioned with collector and frother reagents, is typically formed into a thin layer which feeds into a mixing passage, together with a thin layer of liquid mixture which is directed, via a flow control surface, from a containment vessel of the flotation cell. These two streams may be thoroughly and intensively mixed with the gas phase by a zone of thin high velocity clean liquid jets which act as energy and gas carriers via an entrainment mechanism. These thin jets provide all the energy requirement for mixing of the liquid mixture streams, gas dispersion, and particle/bubble contacting, as well as energy for recirculation and solids suspension in the vessel of the vessel. The three phase mixture may be discharged from the mixing passage into a vessel where it entrains bulk liquid mixture, creating a zone of low shear rate where finely dispersed bubbles can coalesce. The gas bubbles, loaded with hydrophobic particles, leave the substantially horizontally-travelling liquid mixture flow due to their buoyancy forces and are diverted towards the discharge end of the vessel, remote from the mixing passage end, by inclined bubble guides which distribute froth evenly over the vessel surface. Froth discharges freely or is assisted by a mechanical device into a launder at the discharge end of the vessel, remote from the mixing passage end. The horizontally travelling liquid mixture flow is deflected upwards at the discharge end of the vessel by the curved profile of the vessel base. Part of the flow may be further diverted horizontally by a flow guide element and directed toward a flow control surface at the mixing passage end of the vessel, with the residual flow moving via a single or multiple channelled duct into a discharge launder where it is discharged from the apparatus.

The principle of this invention differs from known flotation devices in that high velocity thin jets of clean liquid are used as energy and gas carriers. The gas is entrained by a length of free jet which accelerates the surrounding gas envelope and by the plunging of this jet with an accompanying air envelope between two layers of liquid mixture fed into a mixing passage at a much lower velocity. The high shear rate due to the velocity differential between these three streams results in shredding of the gas envelope into very small bubbles and provides very intense agitation accompanied by high turbulence. There are also high deceleration levels present in the mixing zone as the thin jet with a velocity typically of about 50 m/s is decelerated to 3 m/s on a pass length of about 0.3 m. Further, the very high turbulence in the mixing-zone creates high acceleration levels in small eddies. High accelerative fields promote inertial impaction of particles and bubbles leading to improvement in their collision efficiency. It is known from flotation practice that very fine particles have very poor collision efficiency and consequently poor flotation rates at gravitational acceleration. This is caused by the tendency of fine particles to follow fluid flowlines at these accelerations, so inertial impaction effects are virtually absent in such a case. The high decelerative/accelerative fields created by the present process has led to improved particle/bubble contacting and therefore improved flotation kinetics particularly important in the fine particles range. The thin high velocity clean liquid set technique has the advantage over other high intensity mixing techniques in that there are no moving parts, such as the impellers of the mechanical flotation machine. in contact with abrasive slurry. Also, there are no complex stationary parts in contact with high velocity abrasive slurry, such as the stator of mechanical flotation vessels or various, injection nozzles, diffuser nozzles, or aerator nozzles as encountered for example, in the Bahr cell [1], the Davcra cell [2], the Jameson cell [3], the air sparged hydrocyclone [4], or the Simonis cell [5]. The absence of undissolved solids in clean liquid jets allows much higher jet velocities to be used than in slurry injecting nozzles, without noticeable wear to the nozzle. This feature of the present invention permits creation of a higher shear rate in the mixing zone, leading to better gas dispersion and particle/bubble contacting. The absence of solids in clean liquid jets also permits the use of much thinner jets than in the case of slurry injecting nozzles, without the danger of blocking-of small nozzles. Thinner jets exhibit a much higher gas entrainment capacity per unit injected volume than thicker jets because of higher exposed jet surface to unit jet volume ratio. When compared with a single large jet or a cluster of a few jets, thinner jets operated as a zone of many jets Provide much more uniform distribution of entrained air and shear rate, and therefore greater homogeneity of energy dissipation, in the mixing zone volume. This is advantageous since, compared with single jet systems where the energy dissipation is not so uniform, a higher proportion of the liquid mixture feed may be exposed to optimum conditions of energy dissipation for the task in hand. The clean liquid jet can serve as a carrier for dosing or replenishment of flotation reagents, so the slurry may be re-conditioned as it progresses through multiple flotation stages in the plant. Injection of clean liquid into flotation slurry feed causes dilution of the original pulp, leading to better concentrate grades than those obtained from undiluted slurries. The injected liquid is easily reclaimed in thickeners before tailings disposal.

The method also permits vessel operation in a froth crowding mode which yields, in the case of mineral flotation, superior concentrate grade to conventional froth management techniques. The froth crowding mode-of operation is induced by promoting longitudinal flow of the liquid mixture on the surface of the vessel. This flow carries rapidly draining froth of very low solids concentration from the mixing passage end towards a froth weir located at the froth discharge end of the vessel, where the froth accumulates and thickens. This technique permits very effective draining of a relatively shallow froth layer before it thickens at the froth weir and is discharged. The froth crowding technique also permits vessel operation with very fragile, easy to drain froth which would not survive in a conventional vessel. The froth crowding technique yields particularly high grade concentrates in scavenging operations, without the necessity of froth washing. As a result of this superior froth management technique the method requires less frother than conventional mechanical cells, resulting in potential saving on reagent costs.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
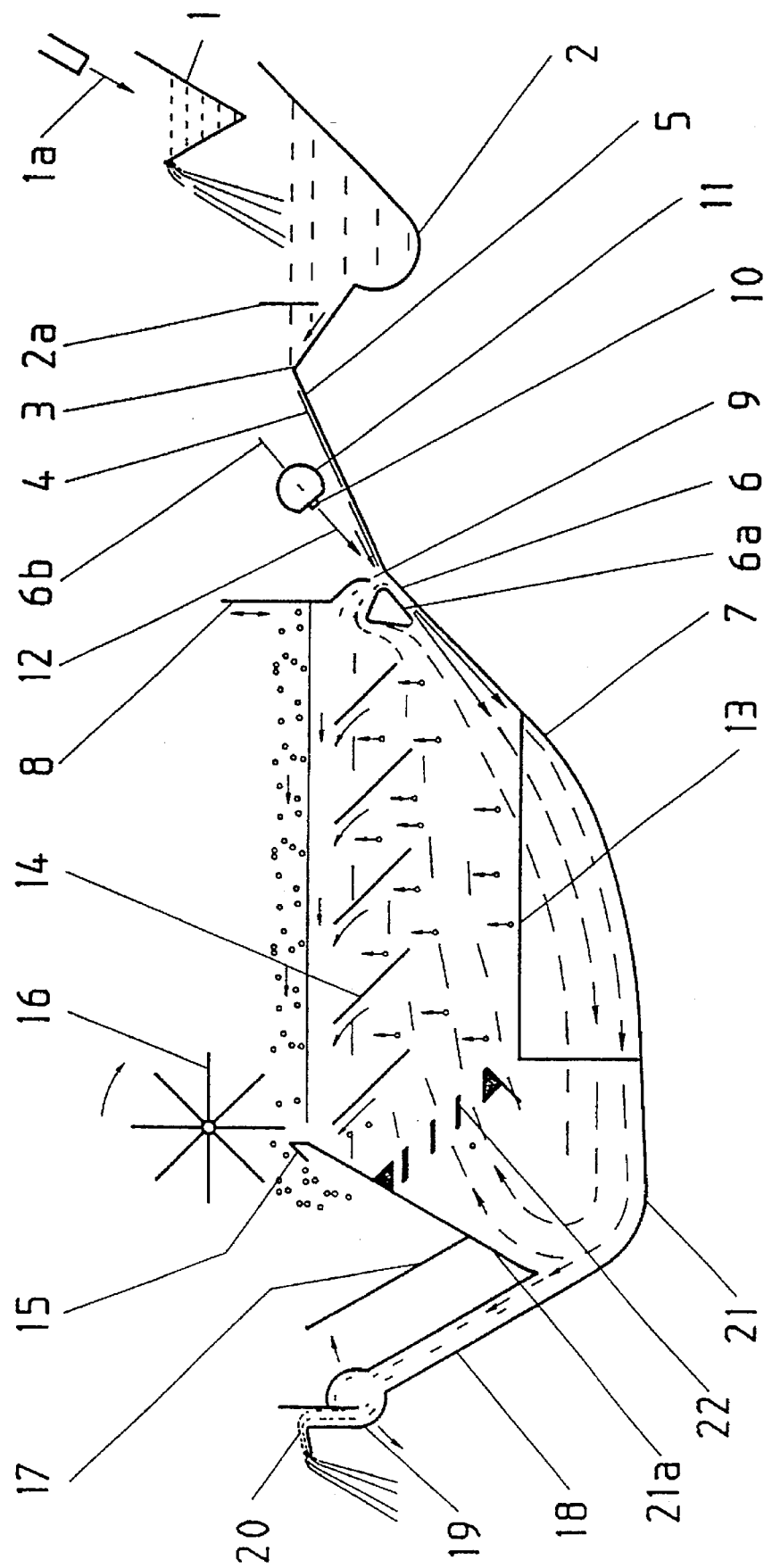
FIG. 1 is a schematic cross-sectional elevational view of a froth flotation apparatus.
Figure 2:
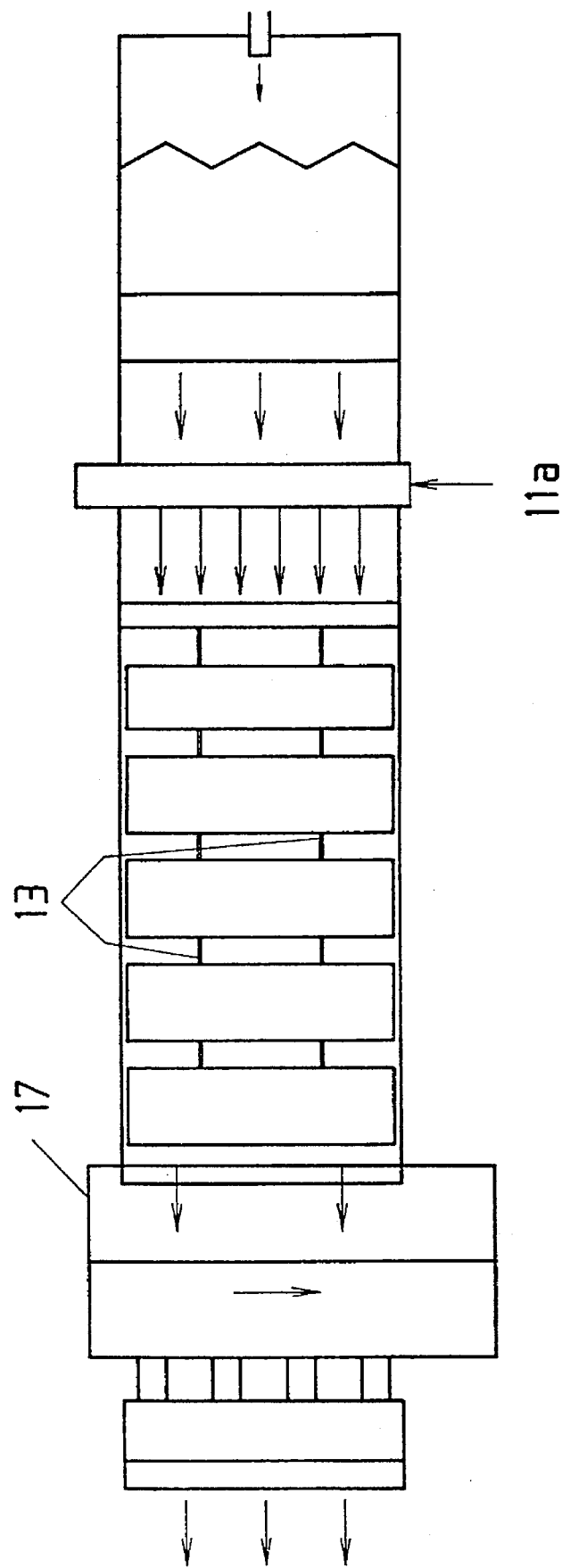
FIG. 2 is a plan view of the flotation apparatus of FIG. 1.
Figure 3:
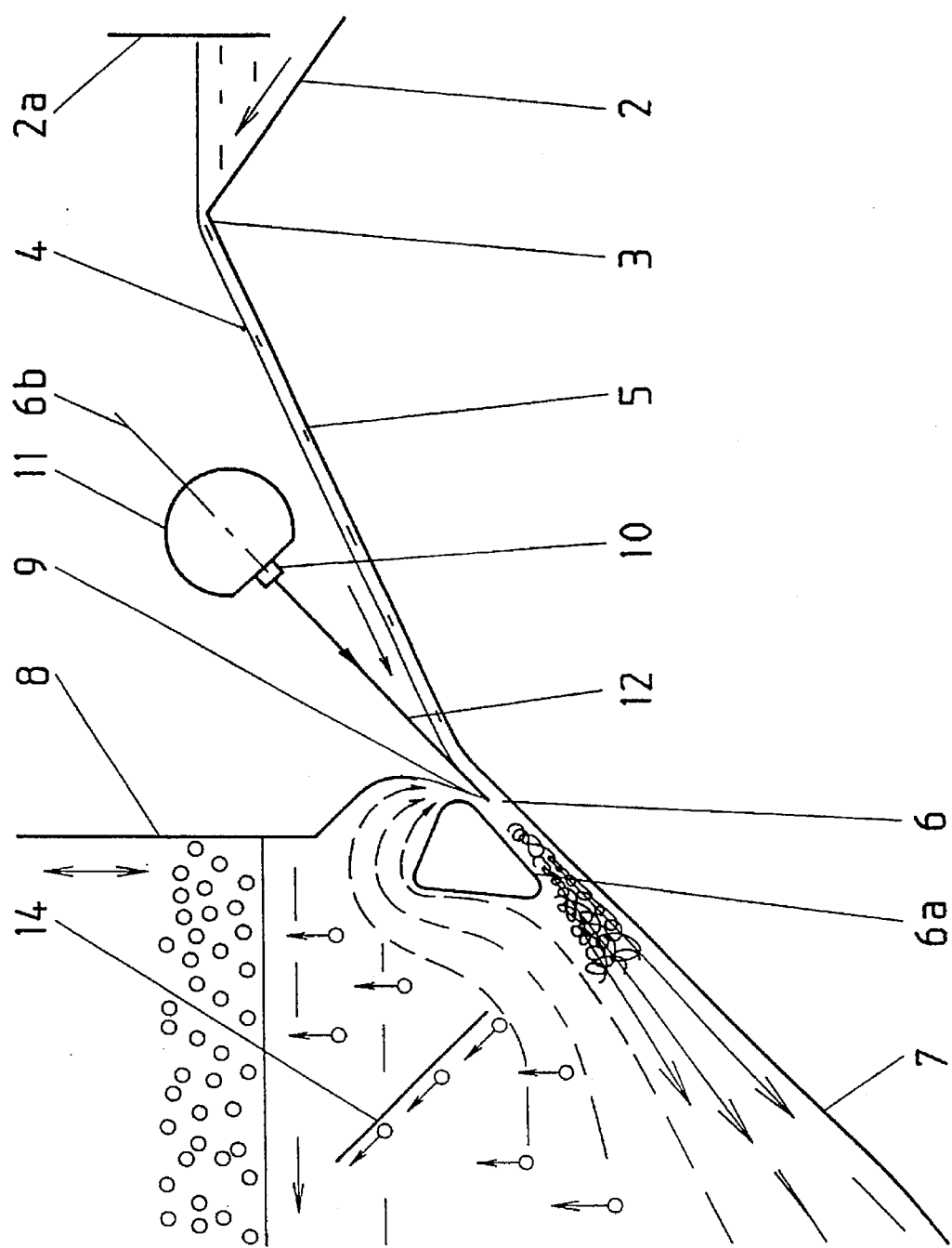
FIG. 3 is a schematic illustration showing mixing passage detail.

A feed stream (1a) and distribution trough (1) are positioned above a layerflow forming chamber (2), which is provided with a discharge weir (3). The layer-flow forming chamber contains rectangular baffles (2a) upstream of discharge weir (3), and connects downstream of weir (3) to the entry of a mixing passage (6), via an inclined surface (5) which is inclined typically 30° below horizontal. Mixing passage (6) is divergent in the direction of flow about a plane of symmetry inclined typically 45° below the horizontal, being defined by the sloping wall of a vessel (7) and the opposing surface of a wedge separator element (6a). Above wedge separator element (6a), a vertically adjustable flow control surface or recycle gate (8) is positioned between vessel (7) and the entry to mixing passage (6). Above mixing passage (6), and co-planar with its plane of symmetry (6b), an array of small nozzles (10) is held in a common manifold (11), which is connected to a pressurised supply of clean liquid (11a). Downstream of mixing passage (6), a flow path for the segregating gas and liquid phases is defined by the contoured walls (21&21a) of vessel (7) in combination with stabilising baffles (13), a horizontal flow guide (22) and bubble diverting guides (14). Liquid phase flexible discharge ducts (18) are connected to the extremity of vessel (7), remote from mixing passage (6), terminating in a discharge launder (19) which is vertically adjustable. At a height above the discharge ducts (18), vessel (7) is provided with froth discharge means in the form of a froth weir (15) and mechanical scraper (16). Below weir (15) is a froth collection launder (17).

In operation, a suitably conditioned slurry feed is introduced continuously to trough (1) from which it is distributed into slurry layer-flow forming chamber (2). The weir (3) of slurry layer-flow forming chamber (2) discharges an evenly spread layer of slurry (4) onto inclined plate (5) feeding it into mixing passage (6). Recirculated slurry from vessel (7) is also fed into mixing passage (6) via recycle gate (8) which forms it into a layer of slurry (9). Small nozzles (10) held in common manifold (11) form an array of clean liquid jets (12) travelling along mixing passage plane of symmetry (6b). In the configuration shown in the drawing, mixing passage plane of symmetry (6b) is inclined 45° from horizontal, but it could be at any angle between 0° and 90°. The array of jets (12) accelerates thin gas envelopes surrounding the jets and plunges between layers of slurry (4) and (9) causing intensive mixing of all streams in mixing passage (6). As there is a considerable velocity difference between clean liquid jets (12), travelling at typically 50 m/s, and slurry streams (4) and (9), travelling at typically 0.4–0.6 m/s, a zone of high shear rate is created which shreds the gas envelope into very fine bubbles. The high shear rate also produces high intensity turbulence whose eddies exhibit high accelerative fields. As liquid jets (12) decelerate from about 50 m/s to about 3 m/s over a passage of typically 0.3 m, high decelerative fields are created in the mixing zone. These high accelerative/ decelerative fields augment inertial particle/ bubble collisions and lead to improved collection of fine particles. A multiphase mixture flow is discharged from mixing passage (6) into vessel (7), where it flows past one or more longitudinal stabilising baffles (13) positioned at the bottom of vessel (7), the flow velocity being attenuated by entrainment of bulk liquid mixture. Gas bubbles loaded with hydrophobic particles disengage from the stream, rise towards the liquid surface and are diverted by bubble diverting guides (14) towards the froth discharge end of the vessel. This arrangement promotes uniform froth generation over the entire surface of vessel (7). The rising air bubbles induce an upward slurry flow which is diverted by the bubble guides (14) towards the discharge end of vessel (7), resulting in a well defined surface flow capable of carrying even very frail froth towards froth weir (15). As the thin layer of froth travels towards froth weir (15) it drains liquid and entrained gangue particles, and thickens due to the crowding against weir (15), where it is subsequently discharged either-freely or by mechanical paddle (16) into froth launder (17). The slurry flow at the froth discharge end of vessel (7) is diverted upwards by curved bottom (21) where in turn part of the slurry flow is diverted horizontally by flow guide (22) towards recycle gate (8), while the other part passes via flexible discharge ducts (18) into discharge launder (19) whose position is vertically adjustable. The residual slurry leaves discharge launder (19) via a weir (20) into the next flotation cell or process stage.

The operation of the flotation cell is controlled in the following way. Mixing intensity, shear rate and acceleration/ deceleration level are controlled by the velocity of the thin jets (12) which is in turn controlled by the operating pressure in the manifold (11). Gas entrainment rate increases with increased jet velocity, but may also be controlled by changing the magnitude of the recycle stream through vertical adjustment of recycle gate (8). Gas entrainment rate may also be controlled by varying the width of mixing passage (6) or by varying the free length of jets (12) by moving manifold (11) to or from the entrance of mixing passage (6). Froth height and froth flow in vessel (7) are controlled by the liquid level in the vessel and by the rotational speed of mechanical paddle (16). The liquid level in the vessel is controlled by moving the flexibly connected discharge launder (19) up or down.

I claim:

1. A method for separating dispersed particulate material from a liquid in which it is suspended, and/or for separating a dispersed liquid phase from an emulsion, said method comprising the steps of:

introducing into a mixing passage a first layer of influent liquid mixture containing at least one of a) dispersed particulate material and b) a dispersed liquid phase in an emulsion with a separate second layer of liquid, entraining and dispersing gas into said two layers of liquid mixture by means of high velocity clean liquid jets impinging essentially between and shearing said two layers of liquid mixture in said mixing passage to form a resultant multiphase mixture, said clean liquid jets being substantially free of said dispersed particulate material or dispersed liquid phase, and separating the resultant multiphase mixture downstream of said mixing passage into a froth phase containing at least one of said dispersed particulate material and said dispersed liquid phase, and a residual liquid mixture phase.

2. A method as claimed in claim 1, wherein entraining of gas into the liquid mixture, dispersion of gas in the liquid mixture, a further step of contacting of gas bubbles with the dispersed phase in the liquid mixture, suspension of the dispersed phase of the liquid mixture downstream of said mixing passage, and a further step of recirculation of liquid mixture takes place in a cell bulk compartment downstream of said mixing passage and are conducted by energy and momentum transfer from said high velocity clean liquid jets.

3. A method as claimed in claim 1, wherein liquid mixture is fed into said mixing passage in the form or a single of multiple layers.

4. A method as claimed in claim 1, wherein said second layer of liquid mixture is a recycled portion of said residual liquid phase.

5. A method as claimed in claim 1, wherein reagents are introduced into said liquid mixture layers via said high velocity clean liquid jets.

6. A method as claimed in claim 1, wherein said high velocity clean liquid jets are in single or multiple, planar or curved zone configuration or in cluster configuration.

7. A method as claimed in claim 1, wherein said high velocity clean liquid jets have a diameter typically less than 1 mm.

8. A method as claimed in claim 1, wherein said second layer of liquid mixture is recirculated at a rate controlled by a recycle gate which also controls a rate at which gas entrainment takes place.

9. A method as claimed in claim 1, wherein the rate of gas entrainment, the rate of shearing and consequent acceleration and turbulent mixing intensities generated in said mixing passage, are controlled by the velocity of said clean liquid jets.

10. A method as claimed in claim 1, wherein said froth phase is transported and accumulated by a deliberate longitudinal surface flow in a cell bulk compartment towards a vertical or inclined transverse barrier restricting the froth's movement for the purpose of froth crowding, coalescence and drainage.

11. Apparatus for separating dispersed particulate material suspended in liquid, and/or for separating a dispersed liquid phase from an emulsion, said apparatus comprising a primary feeding means for forming a first layer of influent liquid mixture containing at least one of dispersed particulate material in a liquid or a dispersed liquid phase in an emulsion, a secondary feeding means for forming a second, separate layer of liquid mixture, a mixing passage receiving said layers of liquid mixture, an array of nozzles for providing high velocity clean liquid jets substantially free of said dispersed particulate material or dispersed liquid phase impinging essentially between and shearing said two layers of liquid mixture to form a multiphase mixture in said mixing passage, means for separating said multiphase mixture downstream of said mixing passage into a froth phase, containing at least one of said dispersed particulate material and said dispersed liquid phase, and a residual liquid mixture phase and means for separate discharge of said forth phase and said residual liquid mixture phase.

12. Apparatus as claimed in claim 11, wherein said primary feeding means comprises a feeding hopper equipped with a horizontal weir to facilitate said first liquid mixture layer formation, and a feeding compartment to convey said first layer of liquid mixture to the entry of said mixing passage.

13. Apparatus as claimed in claim 12, wherein said feeding hopper is equipped with one or more surface baffles to mitigate the impact of liquid surface disturbances on the formation of said first liquid mixture layer by said horizontal weir.

14. Apparatus as claimed in claim 12, wherein the bottom of said feeding compartment is inclined between 0° and 90° from the horizontal plane.

15. Apparatus as claimed in claim 11, wherein said mixing passage has an axis of symmetry which is inclined between 0° and 90° from the horizontal plane.

16. Apparatus as claimed in claim 11, wherein said mixing passage comprises walls which diverge at an angle typically less than 15°.

17. Apparatus as claimed in claim 11, wherein said secondary feeding means comprises a flow control surface with either a straight or curved profile in cross section.

18. Apparatus as claimed in claim 11, further comprising flow guiding means to guide said multiphase mixture after exit thereof from said mixing passage.

19. Apparatus as claimed in claim 18, wherein said flow guiding means and said means for separating comprise a containment vessel and one or more longitudinal baffles and transverse bubble diverting guides, said longitudinal baffles being positioned at the bottom of said vessel and the bottom of said vessel being curved upwards at its extremity remote from said mixing passage to redirect the liquid mixture flow towards a flow guide.

20. Apparatus as claimed in claim 19, wherein said bubble diverting guides are located in proximity to the liquid surface of said vessel and the plane of said bubble diverting guides is inclined between 0° and 90° from horizontal, the lower face of said guides facing away from said mixing passage.

21. Apparatus as claimed in claim 11, wherein said means of residual liquid mixture discharge comprises single or multiple rectangular or circular cross section ducts.

22. Apparatus as claimed in claim 11, wherein said means of froth discharge comprise a weir, located remote from said mixing passage, to discharge froth either freely or with mechanical assistance.

23. Apparatus as claimed in claim 11, wherein said means of residual liquid mixture discharge comprise a height adjustable discharge launder actuated mechanically, pneumatically or electrically either by manual, or automatic process control command to control liquid level.

* * * * *